United States Patent

Won

Patent Number: 5,204,864
Date of Patent: Apr. 20, 1993

[54] MULTIPROCESSOR BUS DEBUGGER

[75] Inventor: Chongsoo Won, Baltimore, Md.

[73] Assignee: Westinghouse Electric Corp., Pittsburgh, Pa.

[21] Appl. No.: 568,399

[22] Filed: Aug. 16, 1990

[51] Int. Cl.$^5$ .............................. G06F 11/00
[52] U.S. Cl. ................... 371/29.5; 371/15.1; 395/575
[58] Field of Search ............... 371/29.5, 15.1; 364/200 MS File, 900 MS File; 395/575

[56] References Cited

U.S. PATENT DOCUMENTS

| | | | |
|---|---|---|---|
| 4,281,380 | 7/1981 | DeMesa | 364/200 |
| 4,467,418 | 8/1984 | Quinquis | 395/325 |
| 4,951,283 | 8/1990 | Mastrocola | 371/29.5 |
| 4,958,347 | 9/1990 | White | 371/29.5 |

FOREIGN PATENT DOCUMENTS 2100010 12/1982 United Kingdom ............... 371/29.5

OTHER PUBLICATIONS

B. Sacks, "VME Bus Anomaly Trigger", Ultra View Corp., Oct. 1985, pp. 1-4.
VMEbus Specification, Rev. C.1, Motorola, Printex Publishing, Inc. Oct. 1985, Selected pages and portions.
Horowitz, Paul, and Hill, Winfield, *The Art of Electronics*, 2nd Edition, 1989, pp. 710, 711, 821 and 823-825.

Primary Examiner—Robert W. Beausoliel, Jr.
Assistant Examiner—Ly V. Hua
Attorney, Agent, or Firm—John K. Williamson

[57] ABSTRACT

An arbiter circuit has a first flip flop and a second flip flop. The first flip flop sends a bus request (BR*) signal to the VME bus by toggling the bus request signal when a trigger signal is received. The second flip flop sends a bus busy (BBSY*) signal to the VME bus by toggling the bus busy signal when a bus grant (BG*) signal is received from the VME bus. The second flip flop releases the bus busy (BBSY*) signal on the VME bus when a reset is commanded at the end of the test by a controller or a push button switch. Tests are performed by writing to the bus and reading from the bus by an address register, a write data register and a read data register connected to the address and data lines of the VME bus. The trigger signal source is selected by a trigger select circuit. A data transfer acknowledge trigger can be selected to trigger every time the data transfer acknowledged (DTACK*) line from the VME bus indicates a data transfer on the bus. An external trigger can be selected where a particular trigger source, such as that selected by a moveable test probe, can be used as a trigger. An address trigger can be selected to trigger when the VME bus address matches a particular address. A trigger address can be selected to trigger when the VME bus address matches a particular address a specified number of times.

22 Claims, 4 Drawing Sheets

MULTIPROCESSOR BUS DEBUGGER

BACKGROUND OF THE INVENTION

1. Field of the Invention

The present invention relates to an apparatus for testing over a multiprocessor bus and more specifically relates to an apparatus for issuing, in response to a selected trigger, a bus request and bus busy signal to freeze operation of a multiprocessor bus until a bus test reset is initiated releasing a bus busy signal and resuming operation of the multiprocessor bus.

2. Description of Related Art

A multiprocessor bus allows a plurality of microprocessors to communicate with one another over the bus. A requesting microprocessor which desires to communicate on the multiprocessor bus issues a bus request to initiate communication. The bus request is received by the controlling microprocessor and surrenders control of the multiprocessor bus to the microprocessor issuing the bus request. A bus grant signal is then sent from the bus to the requesting microprocessor issuing the bus request and the requesting microprocessor begins controlling the bus while sending a bus busy signal to the bus.

Many different multiprocessor buses have been commercially in use. For example, the VME bus by Motorola, the NuBUS by Apple, the MULTIBUS I and II by Intel, the VAXBI bus by Digital Equipment, and also the Q-BUS, the FASTBUS and the FUTUREBUS. Systems using each of these multiprocessor buses have a need for debugging bus operation.

When trouble shooting a slave board on Motorola's VME bus, there comes a time when a user needs to pause controller program execution under certain conditions and take control of the VME bus to write or read data and then step or continue through the rest of the program. A software debugger, such as the RT scope from Ready Systems, located in Palo Alto, California, can be used. Using such a software debugger, the following steps are commonly performed: 1) create a program using a high level language; 2) convert the high level language code into the VME system controller board's microprocessor assembly code using a cross compiler; 3) convert the assembly code to binary code and download into the random access memory of the system processor board; 4) display assembly code on a terminal using the software debugger (assuming the debugger is in the system processor board programmable read only memory or random access memory); and 5) determine where the assembly code corresponds to a line in the high level language code. These software debugging steps are difficult because the user has to be familiar with the assembly language code for the microprocessor of the controller to use the software debugger. Learning the assembly language code of a microprocessor can take considerable time.

SUMMARY OF THE INVENTION

An object of the present invention is to provide a hardware multiprocessor bus debugger.

Another object of the present invention is to provide a multiprocessor bus debugger which does not require user knowledge of any particular assembly language or machine language.

An additional object of the present invention is to provide a bus debugger having a moveable test probe as an external trigger source.

It is also an object of the present invention to provide a multiprocessor bus debugger capable of selecting triggers from at least one of an external trigger, a data transfer acknowledge trigger, an address trigger, a counted address trigger, and a normal trigger.

It is still a further object of the present invention to provide a bus debugger capable of writing data to a multiprocessor bus after a hardware seizure of the bus due to a particular trigger condition.

It is still another object of the present invention to provide a bus debugger capable of reading data from a multiprocessor bus after a hardware seizure of the bus due to particular trigger condition.

The present invention allows for testing over a multiprocessing bus by providing an apparatus for seizing multiprocessor bus operation when a particular trigger signal is received. Tests such as reading from or writing to the bus can be performed while the bus is seized. A movable probe selects an external trigger signal. A trigger source selection circuit selects between other trigger signals to seize multiprocessor bus operation after a particular address, after a particular number of addresses, or after every time the multiprocessor bus is accessed. Single step control of bus access steps in a program running on a board communicating with the bus is possible by seizing the multiprocessor bus after every time the bus is accessed.

These together with other objects and which will be subsequently apparent, reside in the details of construction and operation as more fully hereinafter described and claimed, reference being had to the accompanying drawings forming a part hereof, wherein like numerals reference to like parts throughout.

DESCRIPTION OF THE PREFERRED EMBODIMENTS

The Motorola VME bus is described in the Motorola VME bus specification which is specifically incorporated herein by reference. The Motorola VME bus allows for data transfer bus arbitration upon request by a microprocessor board. When several microprocessor boards request use of the data transfer bus simultaneously, the arbitration subsystem of the VME bus detects these requests and grants the bus to one board at a time. The decision concerning which board is granted the bus first depends upon what scheduling algorithm is used. Many algorithms are possible. The VME bus describes three: prioritize, round-robin and single level. Prioritizing arbitration assigns the bus according to a fixed priority scheme where each of four bus request lines has a priority from highest [BR3*] to lowest [BR0*]. Round-robin arbitration assigns the bus on a rotating priority basis. When the bus is granted to the requestor on a bus request line "BR(n)*", then the highest priority for the next arbitration is assigned to the bus request line "BR(n−1)*". Single level arbitration only accepts requests on BR3*, and relies on BR3* and a bus grant daisy-chain to arbitrate the request. The present invention is adaptable to all three types of VME bus arbitration.

For convenience, the most important VME bus terms and the most important signal lines on the VME bus, as described in the Motorola VME bus specification, are defined in the Appendix.

Figure 1:
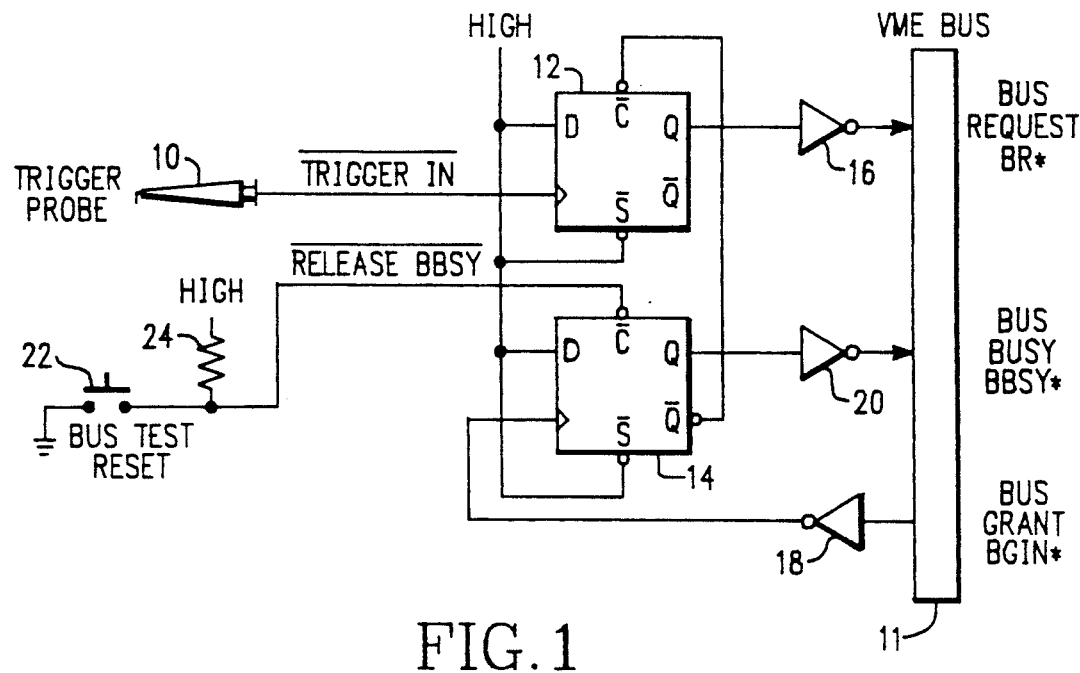
FIG. 1 is a block diagram of a simple bus seizing apparatus in accordance with a first embodiment of the present invention which allows bus debugging.

The bus seizing apparatus of FIG. 1, which allows bus debugging, begins operation when trigger probe 10 delivers a trigger signal to flip-flop 12. When flip-flop 12 receives a trigger signal, it outputs a bus request (BR*) to the VME bus. The bus request is received by the system controller board (SCB) or a presently active or bus controlling microprocessor on the VME bus. Control of the VME bus is then passed to the bus debugger when a bus grant signal (BGIN*) is sent by the system controller board or controlling microprocessor. When flip-flop 14 receives the bus grant signal (BGIN*), flip-flop 14 issues a bus busy (BBSY*) signal on the VME bus 11. The bus debugger outputs the bus busy signal (BBSY*) to indicate the bus debugger is now the master of the VME bus and that the bus debugger is using the bus. Once the bus is seized in this manner, the user can begin debugging operations. Once the debugging operations are complete the apparatus of FIG. 1 releases the seized bus. This occurs when the bus test reset pushbutton switch 22 is activated, and flip-flop 14 toggles the bus busy (BBSY*) line to release the bus. The change in state of the bus busy (BBSY*) indicates to the arbiter of the VME bus to sample the bus grant lines and grant the bus to the highest priority board now requesting use of the bus. Thus, a trigger signal on trigger probe 10 seizes the bus and a bus test reset from push-button switch 22 causes the bus to be released and resume a normal operation. Tests can thus be performed on the VME bus between triggering and the depression of pushbutton switch 22. An oscilloscope, a logic analyzer or other suitable test equipment can be used to measure logic levels on the bus to determine if software or other components in the system are faulty. While the bus is seized, test equipment such as oscilloscopes or logic analyzers can also be used to measure the operation of circuitry on boards connected to the VME bus. Even when the VME bus itself is seized, not all circuits on boards connected to the bus may be seized and some dynamic operation of circuitry on the boards can be observed.

During operation trigger probe 10 is connected to a particular point in a circuit to provide a trigger for seizing the VME bus 11. Trigger probe 10 can be a test probe including a spring actuated hook of a size capable of electrically contacting an electrical component. Such probes are typically used in test equipment such as oscilloscopes, logic analyzers and the like. The trigger probe 10 can also be a simple jumper wire moveable to particular locations on a circuit to be tested for providing a trigger signal. Trigger probe 10 is connected to the clock input of a first D-type flip-flop 12 providing a clock signal when the trigger signal is produced. The Q output of flip-flop 12 is connected via an open collector inverter buffer to the bus request (BR*) line of the VME bus 11 and when the flip flop 12 changes state the request signal is output through inverter 16. When a bus grant signal is produced on a bus grant (BGIN*) line of the VME bus it is connected via a buffer inverter 18 to the clock input of a second D-type flip-flop 14 via an inverter 18 causing the flip flop to change state and produce the busy signal applied to the bus through inverter 20. The D inputs and the set inputs (not-S) of both flip-flops 12 and 14 are pulled high, preferably connected to a TTL+5 volts through a pull-up resistor. The not-Q output of flip-flop 14 is connected to the clear input (not-C) of flip-flop 12 so that the flip flop is cleared when the reset button is depressed releasing the busy signal. The inverted output of the flip flop 14, when the busy signal is removed, clears the flip flop 12 thereby removing the bus request signal. The circuit of FIG. 1 can be bread boarded on a single board or connected directly to a connector representing the single board which plugs into a VME bus back plane. Buffer inverters 16, 18, 20 preferably are open collector devices allowing more than one device to connect in an OR function to a bus line. The buffer inverters can be made from 7433 open collector NOR gates for the VME bus. The buffer inverters can be eliminated if the buffering, inverting or open collector functions are not necessary on other appropriate multiprocessor buses. For instance, on other buses, the inverter function of buffer inverters 16 and 20 might be eliminated by using the not-Q outputs of flip-flops 12 and 14 instead of the Q-outputs of flip-flops 12 and 14. Use of alternative types of flip-flops such as J-K flip-flops can also be configured to perform the function of the D-type flip-flops illustrated in FIG. 1. Additionally, other types of sequential networks such as transistor latches and microprocessors may be used as an alternative to flip-flops.

Push-button switch 22 is connected to the clear (not-C) input of flip-flop 14 to command an end to a test where seizure of the VME bus by the bus debugger is released and the VME bus returns to normal operation. Because the clear input to flip-flop 14 is a not-C input, resistor 24 ties the clear input to high on one end of push-button switch 22 while the other end is tied to ground. Other configurations and switch types other than pushbutton switch 22 are possible. The clear input to flip-flop 14 can be controlled by a microprocessor or other logic circuitry on a board and need not be manually controlled with a switch. The clear input to flip-flop 14 may also be selectively connected by a trigger probe or jumper wire to specific locations in a circuit during a test.

The bus debugger can be made an integral part of a VME slave board and thus a separate board and slot for the debugger can be avoided. By installing jumper wires to the trigger and release inputs of flip-flops 12 and 14, respectively, communication on the bus or even the system controller board can be halted to trouble shoot the slave board. The bus debugger could alternatively be incorporated into a system controller board and, depending upon how the system controller board is configured and programmed, the microprocessor on the system controller board can be halted by the bus debugger. The bus debugger can then take control of the VME bus and write or read to the bus.

Figure 2:
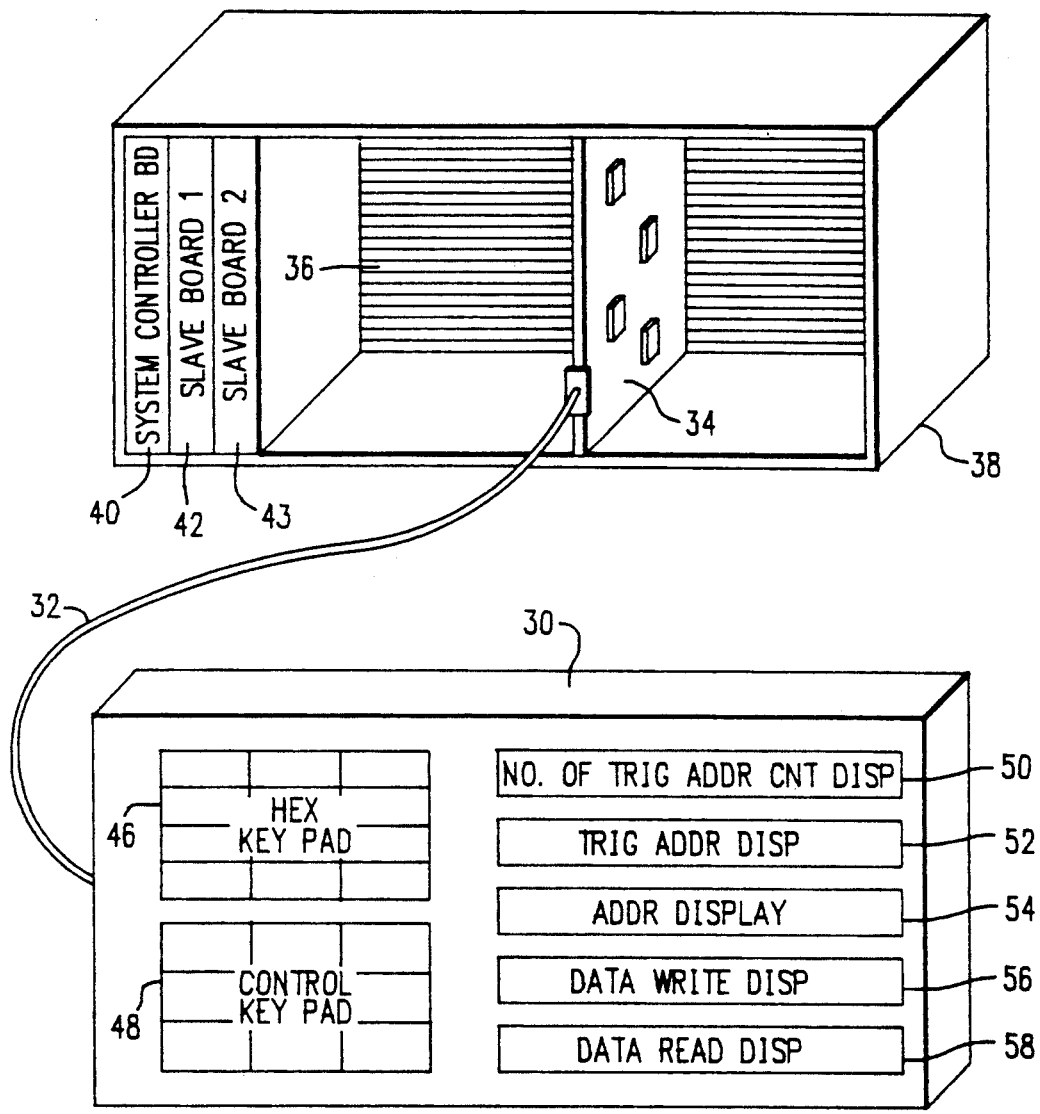
FIG. 2 is a system view of a bus debugger connected to a multiprocessor bus having at least two microprocessors connected to the bus according to a second embodiment of the present invention.

FIG. 2 illustrates a bus debugger according to a second embodiment of the present invention wherein the bus debugger is a stand alone debugger including trigger generating circuitry, bus seizing circuitry and the key pad and display necessary to access the VME bus and read and change bus contents. A detailed block schematic diagram of components for the bus debugger of this embodiment will be described later with reference to FIG. 3. VME hardware debugger keypad and display unit 30 is illustrated in FIG. 2 connected via cable 32 to VME hardware debugger board 34. VME hardware debugger board 34 is connected directly to VME bus back plane 36 via connectors forming a port and is held, as illustrated, by VME card rack 38. System controller board (SCB) 40 and slave boards 42 and 43 are also illustrated connected directly to VME bus back plane 36 in VME card rack 38.

Figure 3:
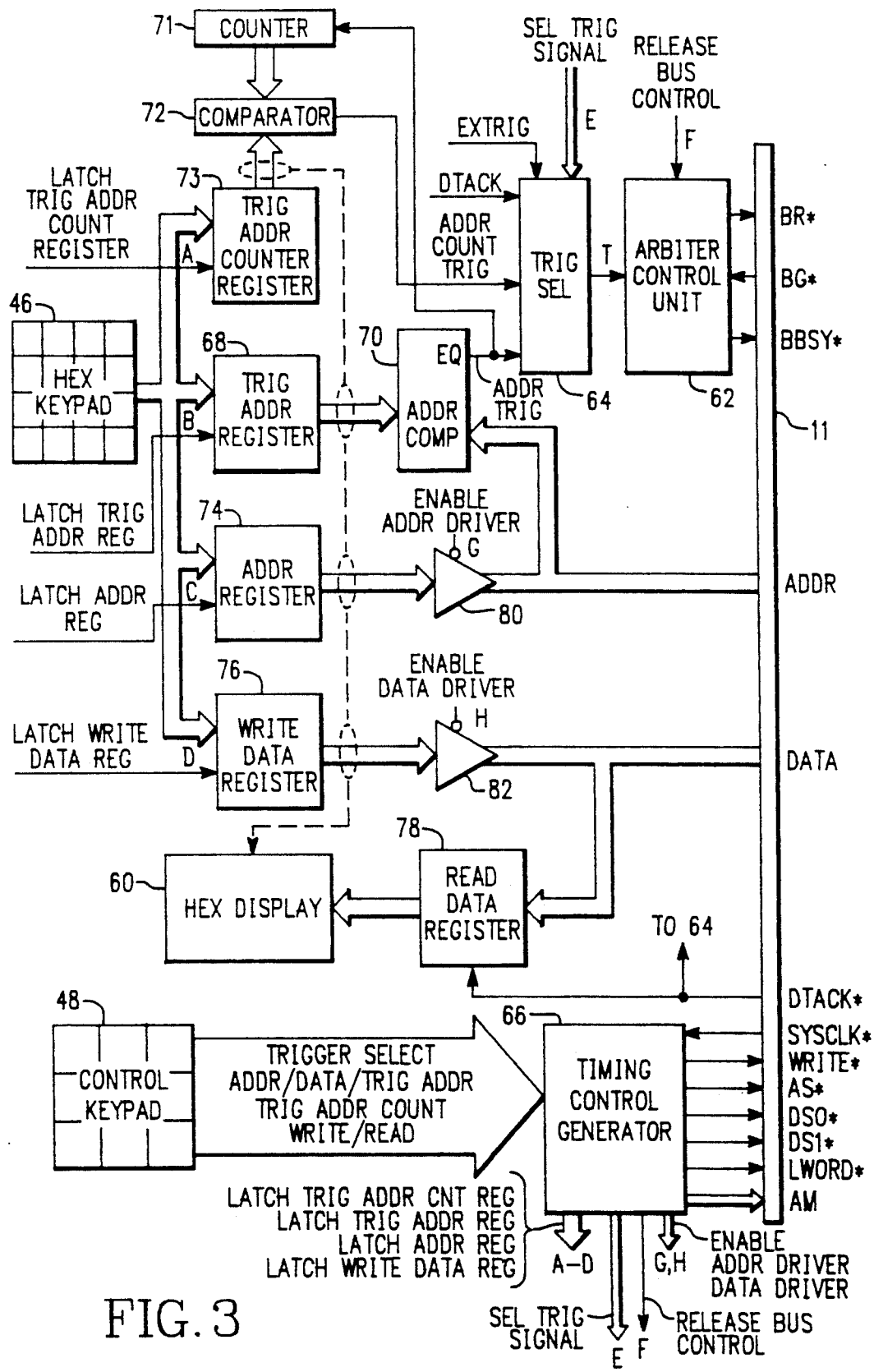
FIG. 3 is a detailed block diagram of components in the second embodiment of the present invention.

The VME hardware debugger keypad and display unit 30 has a hexadecimal keypad 46 and control keypad 48. The VME hardware debugger keypad and display 30 also has trigger address count display 50, a trigger address display 52, an address display 54, a data write display 56 and a data read display 58. The hexadecimal keypad 46 allows selective input of data to registers in the bus debugger as illustrated in FIG. 3. Control keypad 48 allows control of bus debugger operations. Trigger address display 52 displays an address that the bus debugger looks for on the VME bus to issue a trigger. An address the bus debugger is addressing on the VME bus is displayed by display 54. The data write display 56 displays data the bus debugger writes to the bus while the data read display 58 displays data the bus debugger reads from the bus. A count of the number of times an address must be detected on the VME bus before a trigger is performed is displayed via display 50. Further details will no be provided with reference to FIG. 3.

The bus debugger of FIG. 3 is a hardware device that can function as a software/hardware debugger without requiring a user to know the assembly language code of a system controller board's microprocessor or other boards attached to the bus. In order to perform a test, the bus debugger, over an arbitration bus line of a VME bus 11, commands a system controller board to give up control of the bus. The bus debugger then takes control of the bus and acts as a controller board. The bus debugger allows writing to and reading from the VME bus and returns control of the bus to the system controller board when finished. If stepping of bus access steps in a program running on the system controller board or within one of the other boards attached to the bus is desired, the user can halt the controlling board every time the controlling board accesses the bus. Every time bus communication is halted, depending upon the type of board used and how it is programmed, the program running on the board will stop. Halting the board every time it accesses the bus is accomplished by selecting the data transfer acknowledged (DTACK*) line from the VME bus as a trigger.

Figure 4:
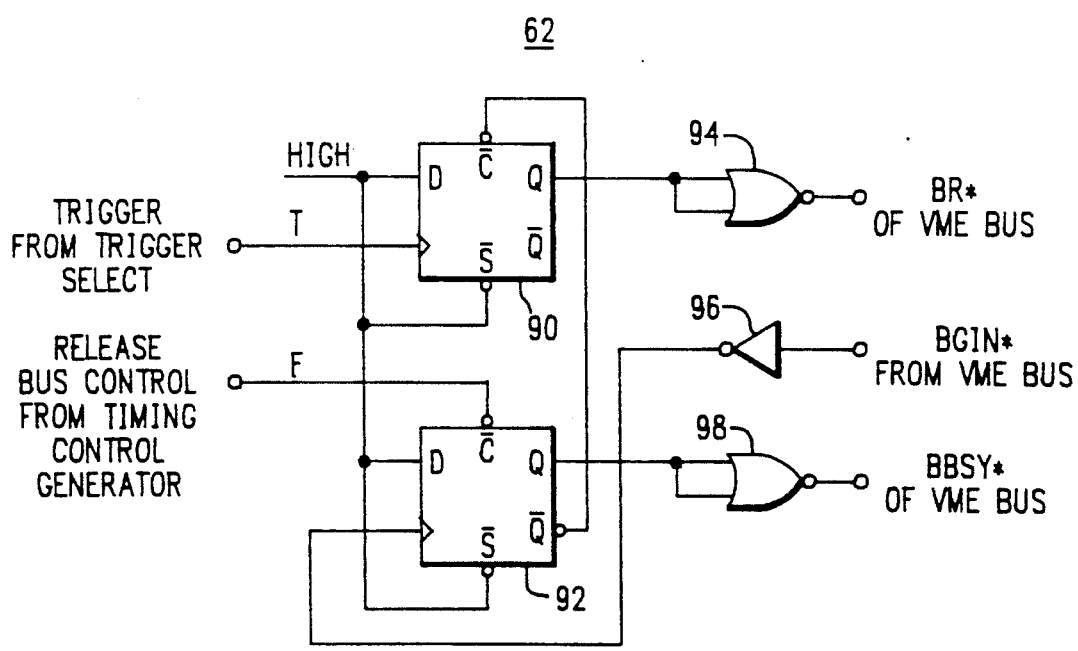
FIG. 4 is a schematic diagram of circuitry for constructing the arbiter control circuit illustrated in FIG. 3.

The present invention uses an arbiter circuit 62 (FIG. 3) having a first flip flop 90 and a second flip flop 92 (FIG. 4). The first flip flop 90 sends a bus request (BR*) signal to the VME bus 11 by toggling the bus request signal when a trigger signal is received from a trigger source selected by a trigger select circuit 64. The second flip flop 92 sends a bus busy (BBSY*) signal to the VME bus 11 by toggling the bus busy signal when a bus grant (BG*) signal is received from the VME bus 11. Writing to and reading from the bus can then be performed by an address register 74, a write data register 76 and a read data register 78 connected to the address and data lines of the VME bus 11. Then, after operations like writing to the bus and reading from the bus have been performed by address register 74, write data register 76 and read data register 78, the second flip flop 92 releases the bus busy (BBSY*) signal on the VME bus 11 when a reset is commanded at the end of the test by a controller 66.

The arbiter control circuit 62 is connected to bus request BR*, bus grant BGIN* and bus busy BBSY* lines on the VME bus 11. Arbiter control circuit 62 is also connected to an output T of trigger select circuit 64 and a release bus control signal F from timing control generator 66. The arbiter control circuit 62 is described in further detail below in conjunction with the discussion of FIG. 4. Arbiter control circuit 62 operates in response to the output signal T from trigger select circuit 64 and seizes the VME bus 11 until the release bus control signal F is received.

Trigger select circuit 64 selects among various triggers including: 1) a data transfer acknowledge trigger (DTACK*), 2) an external trigger, 3) an address trigger and 4) an address count trigger. The data transfer acknowledge trigger (DTACK*) can be selected to monitor the DTACK* line on the VME bus 11 and trigger when the DTACK* line indicates the bus has been accessed. The external trigger can be selected where a particular trigger source, such as that produced via a moveable test probe, can be used as a trigger. The address trigger can also be selected to trigger when the VME bus address matches a particular address. An address count trigger can be selected which triggers when the VME bus address matches a particular address a specified number of times. A trigger address register 68 and address comparator 70 compare a particular address in the trigger address register 68 with an address on the VME bus 11 to generate the address trigger. This signal can be used to increment register 73. A count comparator 71 compares the number of matches stored in register between the particular address in the trigger address register and the address on the bus with a user settable internally stored trigger count and provides the trigger signal when the counts match.

Trigger select circuit 64 selects one of a plurality of trigger conditions for arbiter control circuit 62 to seize the VME bus as previously discussed. The external trigger triggers on an external signal which could be a logic analyzer trigger output or any instrument or device which a user might want to trigger the arbiter control unit. The normal selection is a no trigger position wherein the user does not want to halt the VME bus at this time. The data transfer acknowledge trigger seizes the VME bus every time the VME bus is accessed by the system controller or the like. This occurs when the data transfer acknowledge signal (DTACK*) occurs on the DTACK* line of the VME bus for every data transfer over the VME bus. The address trigger triggers the arbiter control unit when the VME bus address matches an address stored in a trigger address register 68. The address stored in trigger address register 68 is compared with an actual address on the VME bus by address comparator 70. When the address in trigger address register coincides with the address on the VME bus 11, the address comparator 70 issues a trigger signal to trigger select circuit 64. If trigger select circuit 64 selects an address trigger, the trigger from address comparator 70 passes through trigger select 64 to trigger arbiter control circuit 62.

Counter 71 counts the number of times address comparator 70 indicates the VME bus address matches the address stored in trigger address register 68. Comparator 72 issues an address count trigger signal to trigger select circuit 64 when a number of matches specified by trigger address counter register 73 matches the count in counter 71. If trigger select circuit 64 selects a trigger address count trigger, then arbiter control circuit 62 is triggered when the count in counter 71 match the number of matches specified by trigger address counter register 73.

Control keypad 48 inputs control information from the user to timing control generator 66. Control keypad 48 can have keys to program a number of options such as what trigger condition to select or whether to read from or write to the bus. Hexadecimal keypad 46 can be used to enter a data value into any of registers 68, 73, 74 and 76.

Address register 74 accesses the address lines of the VME bus 11 via buffer/driver 80. Address register 74 holds the address for write data register 76 or read data register 78 to write to or read from the VME bus 11. Write data register 76 is connected via buffer/driver 82 to the data lines on the VME bus 11. Write data register 76 holds data to be written to the VME bus 11. The address register 74 holds the address to which the data in write data register 76 is transferred over the VME bus 11. Read data register 78 also is connected to data lines on the VME bus 11. Read data register 78 holds data that has been read from the data lines on the VME bus 11. The address register 74 holds the appropriate address used to access the data stored in read data register 78 from the VME bus 11.

Timing control generator 66 generates VME bus control signals and control signals A-H for the bus debugger hardware. Latch register controls A through D are output from timing generator 66 to control registers 68, 73, 74 and 76. The latch trigger address register control signal A is a strobe which latches the trigger address control register 73. Control signal B is a strobe which latches the trigger address register 68. The latch address register control signal C is a strobe which latches the address register 74. Control signal D is a strobe which latches the write data register 76. Read data register 78 is latched by the data transfer acknowledge (DTACK*) signal from the VME bus 11. Timing control generator 66 outputs select trigger control signal E which commands trigger select circuit 64 to select one of the trigger sources: external trigger, normal (no trigger), data transfer acknowledge trigger (DTACK*), address trigger or trigger address counter trigger. A release bus control signal F which controls arbiter control circuit 62 to release bus control back to the system controller board (SCB) and return the VME bus to normal operation. Timing control generator 66 also outputs control signals to buffer/drivers 80 and 82. Control signal G enables address buffer/driver 80 when reading or writing to the VME bus 11. Enable data driver control signal H enables the data buffer/driver 82 when writing to the VME bus 11.

Timing control generator 66 performs a number of operations as commanded by control keypad 48. For example, timing control generator 66 performs an address loading operation by generating a strobe on latch address register signal C which latches a data value entered in by hexadecimal keypad 46 to the address register 74. Timing control generator 66 performs a write data loading operation using a strobe on latch write data register signal D which latches a data value entered in by the hexadecimal keypad 46 to the write data register 76 and writes to the VME bus. Timing control generator 66 then controls writing to the VME bus 11 by generating VME bus control signals WRITE*, AS*, DS0*, DS1*, LWORD*, AM1--AM5. A read data loading operation starts by generating read data bus control signals: WRITE*, AS*, DS0*, AS1*, LWORD*, AM1--AM5 to the VME bus 11 and subsequently latching incoming data into read data register 78. Timing control generator 66 performs an address trigger loading operation with a strobe on latch trigger address register signal B which latches a data value entered in by hexadecimal keypad 46 to the address trigger register 68. A trigger after a specified number of addresses operation starts by generating a strobe on latch trigger address counter register signal A which latches in a data value entered in by hexadecimal keypad 46 to the trigger address count register 73. A go option entered in on control keypad 48 releases the VME bus back to the system controller board for normal operation by causing generator 66 to issue a release bus control signal F to arbiter control circuit 62. A long word option entered in on control keypad 48 provides for selection between 32, 24, 16 or 8 bit data communication on the VME bus. For the VME bus, SYSCLK* comes from another board on the bus and has a frequency of 60 MHz independent of any other bus timing. The SYSCLK* can be used by controller 66 as a frequency source to save the cost of building a local oscillator. One of skill in digital design would be able to build a circuit to provide the above-described control signals.

Hexadecimal display 60 can display data values in the read data register 78. However, hexadecimal display 60 can also be connected to registers 68, 73, 74 and 76 to display the contents therein. Displays other than hexadecimal display 60 are possible. For example, hexadecimal to binary code and decimal converters may be employed to provide decimal displays. Additionally, video generators may be employed to provide a CRT type display. Likewise, hexadecimal keypad 46 and control keypad 48 can be combined into a more flexible keypad arrangement such as by using an alphanumeric standard computer keyboard. Hexadecimal keypad 46, control keypad 48 and hexadecimal display 60 can be replaced with a dumb terminal and a RS-232 communication circuit or the like could be added to the VME hardware debugger board.

The steps involved in operation of the bus debugger of FIG. 3 are as follows: First, a trigger condition is selected by depressing control keypad 48 and timing control generator 66 to select the trigger source via trigger select signal E by trigger select circuit 64. Second, when a trigger is sensed by the arbiter control circuit 62 on trigger line T, the arbiter control circuit 62 sets the bus request (BR*) line on VME bus 11. Third, when the system controller board (SCB), or another type of controlling board if the system has no bus controller board, grants control of the bus to the bus debugger, by issuing a bus grant signal (BGIN*), arbiter control circuit 62, while continuing to issue a bus request (BR*), asserts the bus is busy by issuing a bus busy (BBSY*) signal to the VME bus 11. Fourth, tests are performed such as inputting address and data information on hexadecimal keypad 46 into registers like address register 74 and write data register 76 and controlling a read or write operation on the line bus 11 under control of controller 66 by depressing keys on control keypad 48. Fifth, control of the VME bus is returned to the system controller board by pushing a go key on control keypad on 48 or a similar bus test reset key, like push-button switch 22, to release the VME bus back to the system controller board for normal operation.

FIG. 4 illustrates the arbiter control 62 of FIG. 3 in greater detail. The trigger input T from trigger select circuit 64 is connected to flip-flop 90 and the release bus control signal F from timing control generator 66 is connected to the clear input of flip-flop 92. Flip-flops 90 and 92 are configured similarly to flip-flops 12 and 14 of the simple bus seizer of the first embodiment of the present invention illustrated in FIG. 1. Flip-flops 90 and 92, like flip flops 12 and 14, toggle the bus request BR* and bus busy BBSY* lines on VME bus 11. The outputs of flip-flops 90 and 92 are connected respectively through open collector NOR gates 94 and 98 to bus release (BR*) and bus busy (BBSY*) lines, respectively. Bus grant (BGIN*) is connected to flip-flop 92 via inverter buffer 96. As described with respect to buffer inverters 16 and 18 of FIG. 1, the open collector gates can be 7433 NOR gates.

Figure 5:
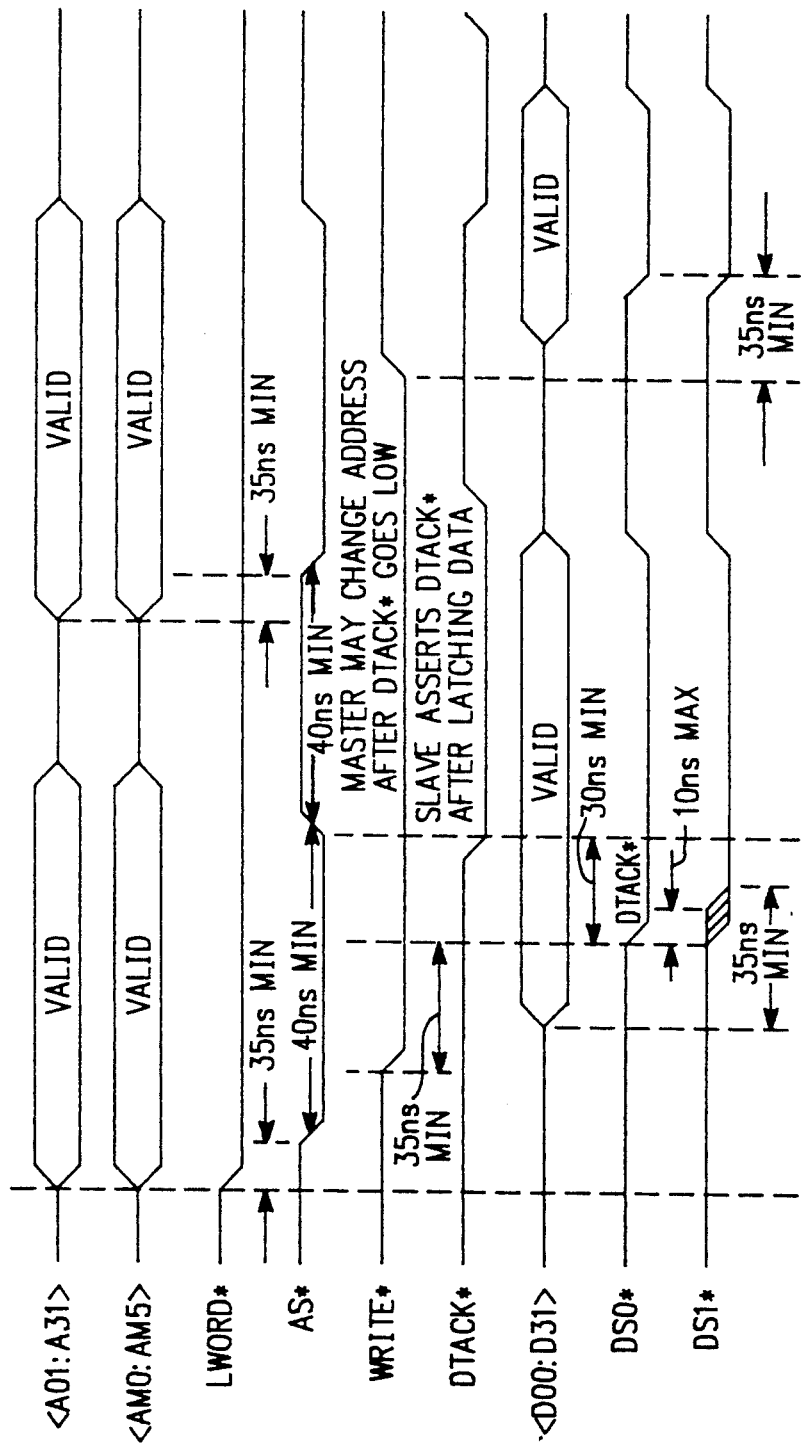
FIG. 5 is a timing diagram of a write/read operation by the bus debugger on a VME multiprocessor bus.

FIG. 5 illustrates a timing diagram for read and write operations by the bus decoder to the VME bus 11. Address lines output from address buffer/driver 80 are illustrated by <A01:A31>. Address modifiers output from address buffer/driver 80 are illustrated by <AM0:AM5>. A long word control signal LWORD* is output to VME bus 11 to select which bit locations within a four byte group are accessed during a data transfer as illustrated. An address strobe AS* is output to the VME bus 11 to indicate when a valid address has been placed on the address bus. A write signal WRITE* is output to the VME bus 11 to indicate whether a data transfer cycle is a read or a write operation. A data transfer acknowledge signal DTACK* indicates, by its trailing edge, that valid data is available on the data bus during a read cycle, or that data has been accepted from the data bus during a write cycle. A rising edge indicates when a slave has released the databus at the end of a read cycle. The data lines output from data buffer/driver 82 to VME bus 11 <D00:D31> are illustrated in the timing diagram of FIG. 5. A data strobe DS0* and a data strobe DS1* contribute to indicating how many data cycles are being transferred. During a write cycle, the falling edge of the first data strobe indicates that valid data is available on the data bus. During a read cycle, the rising edge of the first data strobe indicates that data has been accepted from the data bus.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

APPENDIX

For convenience, the most important VME bus terms, as described in the Motorola VME bus specification, are defined below:

Arbitration—the process of assigning control of the data transfer bus to a requestor.

Arbiter—a functional module that accepts bus requests from requestor modules and grants control of the data transfer bus to one requestor at a time.

Arbitration bus—one of the four buses provided by the VME bus backplane. This bus allows an arbiter module and several requestor modules to coordinate use of the data transfer bus.

Arbitration cycle—an arbitration cycle begins when the arbiter senses a bus request. The arbiter grants the bus to a requestor, which signals that the data transfer bus is busy. The requestor terminates the cycle by releasing the bus busy signal which causes the arbiter to sample the bus requests again.

Backplane (VME bus)—a printed circuit (PC) board with 96—pin connectors and signal paths that bus the connector pins. Some VME bus systems have a single printed circuit board, called the J1 backplane. It provides the signal path that is needed for basic operation. Other VME bus systems also have an optional second printed circuit board, called a J2 backplane. It provides the additional 96 pin connectors and signal paths needed for wider data and address transfers. Still others have a single printed circuit board that provides signal conductors and connectors of both the J1 and J2 backplanes.

Data transfer bus (DTB)—one of the four buses provided by the VME bus backplane. The data transfer bus allows master boards to direct the transfer of binary data between themselves and slave boards.

Master—a functional module that initiates data transfer bus cycles to transfer data between itself and a slave module.

System controller board (SCB)—a board which resides in slot 1 of a VME bus backplane and has a system clock driver, a data transfer bus arbiter and IACK daisy chain driver, and a bus timer. Some also have a serial clock driver, a power monitor or both.

Slave—a functional module that detects a data transfer bus cycle initiated by a master and, when those cycles specify its participation, transfers data between itself and the master.

For convenience, the most important signal lines on the VME bus, as described in the Motorola VME bus specification, are defined below:

A16—A type of module that provides or decodes an address on address lines A01-A15.

A24—A type of module that provides or decodes an address on address lines A01-A23.

A32—A type of module that provides or decodes an address on address lines A01-A31.

AM0-AM5—ADDRESS MODIFIER (bytes 0-5-)—Three-state driven lines that are used to broadcast information such as address size, cycle type and/or master identification.

AS*—ADDRESS STROBE—a three state driven signal line that indicates when a valid address has been placed on the address bus.

BBSY*—BUS BUSY—An open collector driven signal line driven low by the current master to indicate that it is using the bus. When the master releases this line, the resultant rising edge causes the arbiter to sample the bus grant lines and grant the bus to the highest priority requestor.

BG0IN*-BG3IN*—BUS GRANT (0-3) IN—Totem pole driven signal lines having signals generated by the arbiter or a bus requestor. The "bus grant in" signal indicates, to the board receiving it, that it may use the data transfer bus.

BG0OUT*-BG3OUT*—BUS GRANT (0-3) OUT—Totem pole driven signal lines having signals generated by a bus requestor. The bus grant out signal indicates to the next board in a daisy-chain that it may use the data transfer bus.

BR0*-BR3*—BUS REQUEST (0-3)—Open collector driven signal lines with signals generated by requestors. A low level on one of these lines indicates that some master needs to use the data transfer bus.

D00-D31—DATA BUS—Three-state lines driven by directional data lines used to transfer data between masters and slaves.

DS0*, DS1*—DATA STROBE 0, 1—Three-state driven lines with signals used in conjunction with LWORD* (longword, as below) and A01 to indicate how many data bytes are being transferred (1, 2, 3, or 4). During a write cycle, the falling edge of the first data strobe indicates that valid data is available on the data bus. On a read cycle, the rising edge of the first data robe indicates that data has been accepted from the databus.

DTACK*—DATA TRANSFER ACKNOWLEDGE—An open-collector driven line with a signal generated by a slave. The trailing edge of this signal indicates that valid data is available on the data bus during a read cycle, or that data has been accepted from the data bus during a write cycle. The rising edge indicates when the slave has released the databus at the end of read cycle.

LWORD*—LONG WORD—A three-state driven signal line used in conjunction with DS0*, DS1*, and A01 to schedule which byte indication(s) within the four byte group are accessed during the data transfer.

SYSCLK—SYSTEM CLOCK—A totem-pole driven signal line which provides a constant 16 megahertz clock that is independent of any other bus timing.

WRITE*—WRITE—A three-state driven line with a signal generated by the master to indicate whether the data transfer cycle is a read or a write. A high level indicates a read operation; a low level indicates a write operation.

What is claimed is:

1. An apparatus for seizing to allow testing over a multiprocessor bus, said apparatus comprising:
    a test probe receiving a trigger signal;
    a reset circuit commanding an end to a test:
    a first latch responsive to said test probe for toggling a bus request signal to the multiprocessor bus when said test probe receives the trigger signal;
    a second latch, responsive to said reset circuit and the multiprocessor bus, for toggling a bus busy signal to said multiprocessor bus when said reset circuit commands and end to the test.

2. The apparatus of claim 1, wherein said second latch toggles the bus busy signal when a bus grant signal is received from the multiprocessor bus.

3. An apparatus according to claim 1, wherein said reset circuit comprises a reset switch connected to said second latch.

4. An apparatus for seizing to allow testing over a multiprocessor bus, said apparatus comprising:
    a trigger source selector receiving and selecting a trigger signal;
    a reset circuit commanding an end to a test;
    an arbiter circuit, responsive to said trigger source selector, said reset circuit and the multiprocessor bus, for toggling a bus request signal to the multiprocessor bus when said trigger source selector receives the trigger signal and for toggling a bus busy signal to the multiprocessor bus when said reset circuit commands an end to the test.

5. The apparatus according to claim 4, wherein said arbiter circuit toggles the bus busy signal when a bus grant signal is received from the multiprocessor bus.

6. The apparatus according to claim 4, wherein said trigger source selector selects at least a data transfer acknowledge trigger from the multiprocessor bus whereby a trigger signal is supplied every time the multiprocessor bus is accessed.

7. An apparatus according to claim 4, further comprising:
    a keypad;
    a controller connected to said keypad, said trigger source selector or and said arbiter circuit, said controller comprising said reset circuit for commanding an end of a test; and
    an address register connected to address lines of the multiprocessor bus.

8. An apparatus according to claim 7, further comprising:
    a trigger address register storing a target address; and
    an address comparator, connected to said trigger source selector, address lines of the multiprocessor bus and said trigger address register, outputting a trigger to said trigger source selector when the target address in said trigger address register coincides with an address on the address lines of the microprocessor bus.

9. An apparatus according to claim 7, further comprising a counter, connected to said trigger source selector, to output a trigger to said trigger source selector when a predetermined count is obtained.

10. An apparatus according to claim 9, further comprising:
    a trigger address register storing a target address; and
    an address comparator, connected to said counter, said trigger address register and address lines of the multiprocessor bus, to increment said counter when data in said trigger address register coincide with an address on the address lines of the multiprocessor bus.

11. An apparatus according to claim 7,
    wherein said apparatus further comprises a write data register connected to data lines of the multiprocessor bus; and
    wherein said controller controls said write data register to write data in said write data register over the multiprocessor bus to an address indicated by said address register after said trigger source selector has received a trigger signal and said arbiter circuit has toggled the bus request signal.

12. An apparatus according to claim 7, further comprising a read data register connected to data lines of the multiprocessor bus, wherein said controller controls read data register to read data over data lines of the multiprocessor bus from an address indicated by said address register after said trigger source selector receives a trigger signal and said arbiter circuit has toggled said bus request signal.

13. An apparatus for testing over a Versa Module Europa bus, said apparatus comprising:
    a trigger source selector selecting at least a data transfer acknowledge trigger, an external trigger, an address trigger and an address count trigger;
    a reset circuit comprising a reset switch commanding an end to a test;

a first latch responsive to said trigger source selector and toggling a bus request signal to the VME bus when said trigger source selector receives the trigger signal;

a second latch, responsive to said reset circuit and the VME bus, first toggling a bus busy signal when a bus grant signal is received from the VME bus and second toggling a bus busy signal when said reset circuit commands an end to the test;

a keypad;

a controller, connected to said keypad, said trigger source selector and said second latch, wherein said controller comprises said reset circuit for commanding an end of a test;

an address register connected to address lines of the VME bus;

a trigger address register storing a target address;

an address comparator connected to said trigger address register and connected to address lines of the VME bus to output a trigger to said trigger source selector when the target address in said trigger address register coincides with an address on the address lines of the VME bus;

a counter, connected to said address comparator, to count responsive to said address comparator when the target address in said trigger address register coincides with an address on the address lines of the VME bus;

a comparator, connected to said counter and a trigger address counter register, to output a trigger to said trigger source selector when a predetermined count is obtained;

a write data register connected to data lines of the VME bus wherein said write data register writes data in said write data register over the VME bus to an address indicated by said address register after said trigger source selector receives a trigger signal and said first and second latches, have toggled said bus request signal;

a read data register connected to said data lines of the VME bus wherein said read data register reads data over data lines of the VME bus from an address indicated by said address register after said trigger source selector receives a trigger signal and said first latch has toggled said bus request signal; and a display connected to at least said read data register to display the data in said read data register.

14. A method for testing over a multiprocessor bus, said method comprising the steps of:
(a) selecting a trigger source by moving a movable test probe to electrically contact a position in a circuit;
(b) toggling a bus request signal when the moveable test probe receives a trigger signal;
(c) writing data to or reading data from the multiprocessor bus to debug the bus;
(d) toggling the bus busy signal when a bus grant signal is received from the multiprocessor bus; and
(e) toggling a bus busy signal when a reset command is detected.

15. An apparatus for testing over a multiprocessor bus, said apparatus comprising:
seizing means for seizing the multiprocessor bus in response to a trigger signal; and
test means, responsive to said seizing means, for testing over the multiprocessor bus when said seizing means seizes the multiprocessor bus;
wherein said test means reads from the multiprocessor bus to test the multiprocessor bus;
wherein said seizing means comprises:
a trigger source selector for selecting a trigger source for said trigger signal; and
an arbiter circuit for seizing the multiprocessor bus in response to the trigger signal.

16. The apparatus according to claim 15, wherein said arbiter circuit includes:
a first latch to seize the multiprocessor bus by toggling a bus request signal to the multiprocessor bus; and
a second latch to release the multiprocessor bus by toggling a bus busy signal to the multiprocessor bus when a reset is commanded.

17. The apparatus according to claim 16, wherein said second latch toggles the bus busy signal when a bus grant signal is received from the multiprocessor bus.

18. An apparatus according to claim 15, wherein said seizing means further comprises:
an address register connected to address lines of the multiprocessor bus;
a trigger address register; and
an address comparator, connected to said select means, address lines of the multiprocessor bus and said trigger address register, to output a trigger to said select means when data in said trigger address register compare with an address on the address lines of the microprocessor bus.

19. An apparatus according to claim 15,
wherein said seizing means further comprises:
an address register connected to address lines of the multiprocessor bus;
a write data register connected to data lines of the multiprocessor bus;
wherein said write data register writes data in said write data register over the multiprocessor bus to an address indicated by said address register after said select means has received a trigger signal and said arbiter means has toggled the bus request signal.

20. An apparatus according to claim 15, further comprising:
an address register connected to address lines of the multiprocessor bus;
a read data register connected to data lines of the multiprocessor bus, wherein said read data register reads data over data lines of the multiprocessor bus from an address indicated by said address register after said select means receives a trigger signal and said arbiter means has toggled said bus request signal.

21. An apparatus according to claim 15, wherein said seizing means further comprises a counter to output a trigger to said select means when a predetermined count is obtained.

22. An apparatus according to claim 21, wherein said seizing means further comprises:
a trigger address register; and
an address comparator, connected to said counter, said trigger address register and address lines of the multiprocessor bus, to said counter to count when data in said trigger address register compare with an address on the address lines of the multiprocessor bus.

* * * * *